(12) United States Patent
Susekov et al.

(10) Patent No.: US 10,703,983 B2
(45) Date of Patent: Jul. 7, 2020

(54) METHOD FOR PROCESSING RUBBER-CONTAINING WASTE

(71) Applicant: Sergei P. Susekov, Vsevolozhsk Leningradskaya obl. (RU)

(72) Inventors: Sergei P. Susekov, Vsevolozhsk Leningradskaya obl. (RU); Aleksei S. Gradov, St. Petersburg (RU); Evgeny S. Susekov, St. Petersburg (RU)

(73) Assignee: Sergei P. Susekov, Vsevolozhsk Leningradskaya obl. (RU)

( * ) Notice: Subject to any disclaimer, the term of this patent is extended or adjusted under 35 U.S.C. 154(b) by 0 days.

(21) Appl. No.: 16/547,094

(22) Filed: Aug. 21, 2019

(65) Prior Publication Data
US 2020/0010765 A1    Jan. 9, 2020

Related U.S. Application Data

(63) Continuation of application No. PCT/RU2018/000310, filed on May 17, 2018.

(30) Foreign Application Priority Data

Mar. 20, 2017    (RU) ................. 2017109367

(51) Int. Cl.
C10B 47/44    (2006.01)
C10B 1/06    (2006.01)
(Continued)

(52) U.S. Cl.
CPC ........... *C10G 1/10* (2013.01); *B29B 17/04* (2013.01); *C10G 5/06* (2013.01);
(Continued)

(58) Field of Classification Search
CPC ...... B29B 2017/001; B29B 2017/0496; B29B 17/04; C10B 53/07; C10B 57/045;
(Continued)

(56) References Cited

U.S. PATENT DOCUMENTS 4,384,151 A * 5/1983 Audibert ................ C10B 49/14
585/241
4,686,008 A * 8/1987 Gibson ................... C10B 7/10
201/33
(Continued)

FOREIGN PATENT DOCUMENTS

CA    2456498 A1    2/2003
RU    2076501 C1    3/1997
(Continued)

OTHER PUBLICATIONS

International Search Report from PCT/RU2018/000310, filed May 17, 2018, dated Oct. 25, 2018.
(Continued)

*Primary Examiner* — Jonathan Luke Pilcher
(74) *Attorney, Agent, or Firm* — Patentbar International, P.C.

(57) ABSTRACT

A method of processing of shredded rubber-containing waste involves its preliminary preparation, thermal decomposition in a furnace, separation of decomposition products into vapor-gas mixture and solid residue, and separation of a heavy hydrocarbon fraction from the vapor-gas mixture. Preliminary preparation of the waste is carried out by its blowing with water vapor until a waste temperature reaches 100° C., and thermal decomposition is carried out in residual oil in the starting phase, and afterwards in the atomized generated heavy hydrocarbon fraction and superheated water vapor, their weight ratio being (0.1-0.5):1. The heavy hydrocarbon fraction is separated from the vapor-gas mixture with water by atomizing it into the vapor-gas mixture flow at the rate of 5-15% of the mass flow rate of the mixture, while metal is extracted from the solid residue by magnetic separation, after which a product containing zinc oxide is separated by dielectric separation.

1 Claim, 1 Drawing Sheet

(51) Int. Cl.
*C10B 53/07* (2006.01)
*C10G 1/10* (2006.01)
*C10G 5/06* (2006.01)
*B29B 17/04* (2006.01)
*B29B 17/00* (2006.01)
*C10B 57/04* (2006.01)

(52) U.S. Cl.
CPC .. *B29B 2017/001* (2013.01); *B29B 2017/0496* (2013.01); *C10B 1/06* (2013.01); *C10B 47/44* (2013.01); *C10B 53/07* (2013.01); *C10B 57/045* (2013.01)

(58) Field of Classification Search
CPC .......... C10B 47/44; C10B 1/06; C10B 55/04; C10G 1/10; C10G 5/06
See application file for complete search history.

(56) References Cited

U.S. PATENT DOCUMENTS

| | | | | |
|---|---|---|---|---|
| 4,839,151 A | * | 6/1989 | Apffel | C09C 1/482 201/19 |
| 6,657,095 B1 | * | 12/2003 | Holden | C09C 1/482 201/25 |
| 9,169,401 B2 | * | 10/2015 | Susekov | C09C 1/48 |
| 9,346,030 B2 | * | 5/2016 | Susekov | C08J 11/12 |
| 2014/0294686 A1 | * | 10/2014 | Susekov | C08J 11/12 422/150 |
| 2014/0294716 A1 | * | 10/2014 | Susekov | C09C 1/48 423/449.7 |

FOREIGN PATENT DOCUMENTS

| | | |
|---|---|---|
| RU | 2174911 C1 | 10/2001 |
| RU | 2003105252 A | 10/2004 |
| RU | 2245247 C2 | 1/2005 |
| RU | 2250239 C1 | 4/2005 |
| RU | 2291168 C1 | 1/2007 |
| RU | 2460743 C2 | 9/2012 |
| RU | 2519476 C1 | 6/2014 |
| WO | 2003014207 A1 | 2/2003 |

OTHER PUBLICATIONS

Heat Exchangers Handbook: in 2 volumes. vol. 1/ Transl. from English, ed. by B. S. Petukhov and V. K. Shikov.—Moscow: Energoatomizdat, 1987, p. 77, Table 2.

* cited by examiner

METHOD FOR PROCESSING RUBBER-CONTAINING WASTE

RELATED APPLICATIONS

This Application is a Continuation application of International Application PCT/RU2018/000310, filed on May 17, 2018, which in turn claims priority to Russian Patent Application RU 2017109367, filed Mar. 20, 2017, both of which are incorporated herein by reference in their entirety.

FIELD OF THE INVENTION

The invention relates to waste recycling technologies and may be used in the rubber and chemical industry, in the fuel and energy sector, and in the housing and utilities sector to obtain fuel and raw material resources from waste.

BACKGROUND OF THE INVENTION

There is a known method of rubber waste processing (RU Patent No. 2076501, IPC B29B17/00, C08J11/10, C 08J11/14. Published Mar. 27, 1997).

The method includes thermal decomposition of rubber waste in a working fluid consisting 98-85 wt. % of water vapor superheated to 300-1600° C. and 2-15 wt. % of gas obtained after the separation of oil from gaseous decomposition products. Besides, prior to thermal decomposition, rubber waste is mixed with 3-40 wt. % of oil by passing gaseous decomposition products and the working fluid through a layer of waste, their weight ratio being (0.05-1.62):1, and solid products of decomposition are mixed with 4-40 wt. % of oil and compacted into briquettes, simultaneously heating them to 100-500° C. by filtering the gas obtained after the separation of oil from gaseous decomposition products.

Among the disadvantages of this method are:
1. High specific energy consumption for the waste recycling process dictated by the use of water vapor at temperatures of up to 1600° C.
2. Large emissions to the environment of harmful combustion products of fuel used for water vapor generation and its superheating to a high temperature.
3. Low quality of the processing products, since the heavy hydrocarbon fraction containing sulfur compounds and having a high ash content is not separated from oil (liquid products), and the solid products (solid residue) containing industrial carbon are not processed but used as fuel in briquettes.

There is a known method of rubber waste processing (RU Patent No. 2245247, IPC B29B17/00, C08J11/14. Published 20 May 2004.) According to this method, the waste is processed by its thermal decomposition in a furnace, separation of decomposition products into solid and gaseous ones, separation of a liquid phase from the gaseous products, and removing the latter for burning to maintain the decomposition process. Besides, prior to thermal decomposition, the waste is mixed with 5-15 wt. % of water, and then re-mixed with water by atomizing water in the furnace in the amount of 50-150% of the waste's weight, and the solid products of decomposition are sprinkled with water in the amount of 10-20% of the rubber waste's weight. Besides, the condensate obtained by separation from liquid phase is used in place of water.

Among the disadvantages of this method are:
1. High specific energy consumption due to the heating of large amounts of water (up to 150% of the waste weight) during waste processing.
2. Large polluting emissions to the environment generated in the evaporation of condensate contaminated with hydrocarbons, which is both atomized in the furnace and used to sprinkle solid products heated to a high temperature (not lower than 300° C.).
3. Low quality of liquid and solid products of rubber waste, due to the fact that a heavy fraction containing harmful sulfur compounds (mercaptans) is not separated from liquid products, and that solid products are not processed (separated) into carbon-containing products and ash.

A process and plant for recycling rubber-containing waste is known (RU Patent No. 2460743, МПк C08J11/20. Published Sep. 10, 2012.)

Rubber-containing waste is processed by thermolysis of rubber granules at 350-400° C. in circulating superheated and evaporated gasoline under a pressure close to atmospheric. In doing so, rubber granules are decomposed into industrial carbon, synthetic crude oil, and hydrocarbon gas. The generated industrial carbon with absorbed oils is blown with air; in doing so, textile cord is completely burnt, some of the oil is burnt, and some carried off with flue gases.

Among the disadvantages of this method are:
1. High energy consumption of the process due to the necessity to use a circulating heat transfer agent, which has to be separated from the hydrocarbon vapors generated in the thermal decomposition of rubber, and then to be heated in a heat exchanger, evaporated, and superheated in a furnace prior to feeding to the reactor.
2. Large polluting emissions to the environment generated in the combustion of absorbed oils and textile cord. In doing so, some of the oil is carried off to the atmosphere with flue gases.
3. Low quality of industrial carbon due to oil adsorption, therefore industrial carbon is blown with air to remove some of the oil, so that the carbon surface oxidizes and its quality deteriorates. Incomplete extraction of liquid phase (oil) from the gas flow results in losing some of the valuable liquid products.

The closest to the proposed invention is the method of rubber-containing waste processing and the plant for its embodiment adopted by us as the prior art (RU Patent 2291168, IPC C08J11/04, C08J11/20, B29B17/00. Published Jan. 10, 2007.)

The method of processing of rubber-containing waste or a mixture of rubber-containing and polymer waste includes a stage of its preliminary preparation, a stage of thermal decomposition in a furnace with separation of decomposition products into vapor-gas mixture and solid residue, a stage of separation of liquid phase from the vapor-gas mixture generating hydrocarbon-containing gas, and a stage of separation of carbon-containing product from the solid residue. Furthermore, at the preliminary preparation stage, whole and/or shredded waste is blown with natural gas at the start of the first cycle of processing, and at subsequent stages, with hydrocarbon-containing gas with subsequent impregnation with a hydrocarbon solvent, i.e. liquid hydrocarbon fraction with a boiling point not higher than 220° C. for at least 15 minutes, where the stage of thermal decomposition in the first cycle takes place in natural gas heated to 400-500° C., and in subsequent cycles in hydrocarbon-containing gas heated to 400-500° C.; the liquid phase is separated from the vapor-gas mixture in three stages, the vapor-gas mixture being cooled to 300-360° C. at the first stage with subsequent separation of a heavy hydrocarbon fraction, and to a temperature not exceeding 220° C. at the second stage with subsequent separation of a hydrocarbon fraction and recirculation of a part thereof to the stage of preliminary waste preparation to be used as hydrocarbon solvent, while at the third stage, the vapor-gas mixture is cooled to a temperature below 30° C. with subsequent separation of a light hydrocarbon fraction; the hydrocarbon-containing gas generated after the liquid phase separation from the vapor-gas mixture is separated into at least four flows, one of which is directed to combustion for heating the second flow of hydrocarbon-containing gas, which is fed into the furnace for the thermal decomposition stage, the third flow being used for blowing at the preliminary waste preparation stage, and the fourth flow being supplied to the user; the solid residue is blown with air and cooled before the hydrogen-containing product separation stage, and the gases generated after the blowing at the preliminary waste preparation stage and the solid reside blowing are directed for burning to heat the second flow of hydrocarbon-containing gas.

Among the disadvantages of this method are:

1. High energy consumption due to several stages of the recycling process, no thermal energy recirculation (thermal energy recycling to the process), the need to use an additional heat transfer agent in the form of natural gas, and inevitable heat losses in the processes of heating the heat transfer agent in the heat exchanger, its evaporation, and superheating prior to feeding into the furnace.

2. Large polluting emissions to the environment generated in the air blowing of heated solid residue, resulting in oxidation of carbon and residual hydrocarbons contained in solid residue, with toxic combustion products generated.

3. Low quality of carbon-containing product due to partial oxidation in the air blowing of solid residue, which results in a higher ash content in carbon-containing product and a lower carbon content.

SUMMARY OF THE INVENTION

The object of the proposed invention is lower energy consumption for the recycling process, lower environmental pollution, and higher quality of products obtained from rubber waste.

To solve the problem, according to the invention, in the method of processing of rubber-containing waste including its preliminary preparation, thermal decomposition in a furnace, separation of decomposition products into vapor-gas mixture and solid residue, and separation of a heavy hydrocarbon fraction from the vapor-gas mixture, preliminary preparation of the waste is carried out by its blowing with water vapor, and thermal decomposition is carried out in the atomized heavy hydrocarbon fraction and superheated water vapor, their weight ratio being (0.1-0.5):1; the heavy hydrocarbon fraction is separated from the vapor-gas mixture with water by atomizing it into the mixture flow at the rate of 5-15% of the mass flow rate of the mixture, while metal is extracted from the solid residue by magnetic separation, after which a product containing zinc oxide is separated by dielectric separation.

Waste blowing with water vapor removes air from the waste, since air fed with the waste into the furnace may cause waste ignition or explosion when air is mixed with thermal decomposition gases heated in the furnace. In doing so, the waste heating is significantly intensified due to condensation of some of the water vapor on the cold waste surface in the process of waste blowing. This is because a high intensity of heat transfer is achieved by water vapor condensation. It is known (see Heat Exchangers Handbook: In 2 volumes. Vol. 1/Transl. from English, ed. by B. S. Petukhov and V. K. Shikov.—Moscow: Energoatomizdat, 1987, page 77, Table 2) that in water vapor condensation, the heat transfer coefficient reaches a value of 2000-50000 W/m$^{2\circ}$ C., and in case of forced convection, which is observed when blowing the waste with gaseous heat transfer agent (natural gas or gaseous hydrocarbons), the heat transfer coefficient does not exceed 200 W/m$^{2\circ}$ C.

Thus, waste blowing with water vapor prior to its feeding to the furnace ensures their high speed of heating to 100° C. (the heating speed is about 10-25 times higher than when blown with a gaseous heat transfer agent without condensation); as a result, the heat losses related to waste heating are reduced, with the energy consumption for rubber waste processing respectively reduced.

Since in the condensation of water vapor, condensation heat of about $r_K$=2500 kJ/kg is generated on the waste surface to be used for waste heating, the consumption of heat transfer agent (water vapor) for the waste heating process is noticeably reduced.

Therefore, preliminary blowing of waste with water vapor, as compared to blowing with natural gas or gaseous hydrocarbons provides an effect of not only air displacement from waste, but also of highly intense waste heating prior to its feeding into the thermal decomposition furnace, thus achieving the effect of reduction of energy consumption for rubber waste processing.

Thermal decomposition of rubber waste in a furnace, in the atomized heavy hydrocarbon fraction and superheated water vapor at their weight ratio of (0.01-0.5):1, ensures a high speed of waste heating, and lower generation of harmful compounds during the thermal decomposition due to the water vapor suppressing the generation of persistent organic pollutants.

It is the presence of atomized heavy hydrocarbons (drops of liquid hydrocarbons with a boiling point of at least 300° C.) in the water vapor medium that increases the density of such medium, thus increasing the heat transfer from such medium to rubber waste.

A reduction of the weight ratio of the heavy hydrocarbon fraction and water vapor to less than 0.1:1 (kg/kg) leads to an abrupt decrease in heat transfer from such medium to the waste, i.e. in this case the intensity of heat transfer is actually equal to the intensity of heat transfer to the waste from pure (containing no hydrocarbon drops) water vapor. In its turn, a decrease in heat transfer intensity in the furnace leads to an increase in the time needed to heat the waste, and as a result, to higher heat losses, and thus to higher energy consumption for the recycling process.

It is the use of the heavy hydrocarbon fraction as atomized fluid that enables creation of such fluid, containing hydrocarbon drops but not hydrocarbon vapors. This is achieved because the heavy fraction's boiling point is at least 300° C., so that they slowly evaporate in the furnace. The use of the light fraction (boiling point below 300° C.) will in this case result in rapid evaporation of hydrocarbon drops and abrupt drop of intensity of heat energy transfer to the waste.

An increase in the weight ratio of the heavy fraction and water vapor over 0.5:1 results in a sharp increase of the heavy fraction consumption, and instability of the heavy fraction drops-water vapor mixture due to inevitable fusion of the drops and formation of jets, which sharply decreases the specific surface of the totality of all drops in the vapor medium, and thus the intensity of thermal energy transfer to the waste.

Thus, it is thermal decomposition in the atomized heavy hydrocarbon fraction and superheated water vapor at their weight ratio of (0.1-0.5):1 that ensures a high intensity of heat transfer to rubber waste and a low consumption of heavy fraction, and as a result, reduces the energy consumption for the process by reducing the heat losses in the thermal decomposition of waste due to a shorter time of the waste's dwell in the furnace.

It should also be noted that in the separation of a heavy fraction from the vapor-gas mixture, carbon dust particles are also separated, which are inevitably carried from the furnace with the vapor-gas mixture flow. It is the dust particles settling on pipeline surfaces and in condensation systems that result in pipeline clogging and sharp decrease of heat exchange in the condensation systems, and thus in the equipment's failure. Therefore, these particles (carbon dust) must be separated from the vapor-gas mixture right at the furnace outlet. This is provided by extracting the heavy fraction from vapor-gas mixture by water, by atomizing it into the mixture flow at a rate of 5-15% of the mass flow rate of the mixture. The supply of water drops into the vapor-gas mixture flow at the furnace's outlet results in abrupt cooling of the mixture and condensation of some of the hydrocarbons as drops of heavy liquid fraction, and settling of carbon dust carried from the furnace on the generating drops of liquid hydrocarbons.

The use of water for the settling of carbon dust and condensation of the heavy hydrocarbon fraction B at a rate less than 5% of the mixture's mass flow rate does not provide mixture cooling with separation of a heavy fraction, and settling of carbon dust. Therefore, to achieve heavy fraction separation and carbon dust settling, it is necessary to atomize water into the mixture flow at the rate of at least 5% of the mixture's weight ratio.

Water atomizing into the vapor-gas mixture flow at a rate of over 15% of the mixture's mass flow rate leads to an abrupt cooling of the mixture, so that not only the heavy fraction is condensed, but also light hydrocarbons, generating a large amount of liquid containing water and liquid hydrocarbons. In this case, water evaporation is not complete; as a result, the separated liquid hydrocarbons contain a large amount of water, so that additional processes of separation of the generated liquid become necessary. The quality of liquid products obtained also declines due to high water content.

Thus, water atomization into the vapor-gas flow at a rate of 5-15% of the mixture's mass flow rate results in complete evaporation of water and provides a mist of small droplets of heavy fraction, which absorbs carbon dust from the vapor-gas mixture. Separation of a heavy hydrocarbon fraction from the vapor-gas mixture improves the quality of residual hydrocarbons of the vapor-gas mixture, due to separation of sulfur compounds with the heavy fraction and to carbon dust separation.

In doing so, water separated from liquid products generated after cooling the vapor-gas mixture and hydrocarbon condensation is used for atomization.

The use of the heavy hydrocarbon fraction to provide in the furnace a medium where thermal decomposition of waste is carried out additional thermal decomposition of hydrocarbons of the heavy fraction, reducing their molecular weight and thus improving the quality performances of liquid products of rubber waste thermal decomposition.

The solid residue of rubber waste thermal decomposition contains industrial carbon, metal cord, and various metal oxides that were added to the rubber mixture at the stage of manufacturing of rubber products. Therefore, the solid residue without pre-treatment cannot be used not only for manufacturing of new rubber products, but also even as solid fuel, since it contains a large quantity (up to 15 wt. %) of various oxides, including heavy metal oxides. As the solid residue contains a large quantity (at least 5 wt. % depending on the waste type) of zinc oxide, and may contain metal cord (for instance in recycling of worn tires), the solid residue must be treated to separate metal and the product containing zinc oxide, a valuable material. This is achieved at first by magnetic separation of metal, and next by dielectric separation of product containing zinc oxide. After magnetic and dielectric separation of the solid residue, an analog of industrial carbon, metal, and a product containing at least 35-40% wt. of zinc are obtained.

Thus, the quality of solid products of rubber waste decomposition is improved and valuable feedstock is obtained to extract zinc oxide and to return it to rubber product manufacturing.

DETAILED DESCRIPTION OF THE PREFERRED EMBODIMENTS

Figure 1:
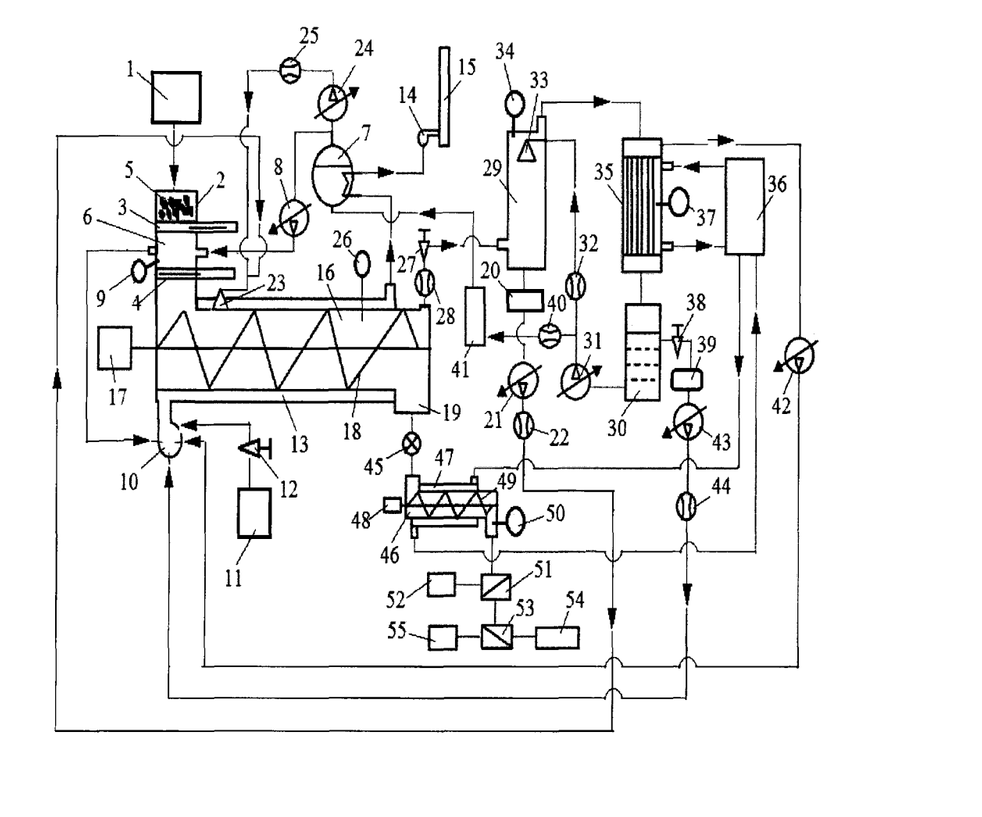
FIGURE is a diagram of the plant embodying the method of rubber-containing waste processing.

The plant contains accumulator 1 connected to bin 2; gates 3 and 4 for loading shredded rubber waste 5; bin 6 connected to steam generator 7 via pump 8; temperature sensor 9; burner 10 connected to tank 11 via valve 12; heating jacket 13, smoke exhauster 14; smoke stack 15; furnace 16; motor 17 connected to screw 18; discharge channel 19; tank 20 connected to adjustable pump 21 with flowmeter 22; nozzle 23 connected to adjustable pump 24 with flowmeter 25; temperature sensor 26; valve 27 with flowmeter 28; scrubber 29; settler 30 connected via pump 31 and flowmeter 32 to nozzle 33; temperature sensor 34; condenser 35 connected to cooling tower 36, temperature sensor 37; valve 38 connected to tank 39; flowmeter 40 connected to filter 41; adjustable pump 42; adjustable pump 43 connected to flowmeter 44; lock feeder 45 connected to cooler 46 with cooling jacket 47; motor 48 connected to screw 49; temperature sensor 50; magnetic separator 51 connected to accumulator 52 and dielectric separator 53; accumulator 54 and accumulator 55.

According to the invention, rubber-containing waste is processed as follows.

Shredded rubber waste 5 in the form of chips is fed from accumulator 1 to bin 2 with gates 3 and 4 closed. After bin 2 is filled up, gate 3 is opened, and the waste from bin 1 spills down into bin 6 and is held off on gate 4. After this, gate 3 is closed. Water vapor is supplied from steam generator 7 to bin 6 with adjustable-delivery pump 8, being filtered through a layer of shredded waste. During the filtering, water vapor is cooled and partially condensed, and the rubber waste is heated with the water vapor condensation heat. In doing so, the waste heating temperature is monitored by readings of temperature sensor 9, with water vapor supplied to bin 6 until the waste is heated to $T_H = 100°$ C.

Some of the water steam fed to bin 6 is completely condensed, and as a result of emission of condensation heat and high-intensity heating, the rubber waste are rapidly (for about 3-5 minutes, depending on the quantity of waste in bin 6) heated to the condensation temperature of 100° C., and the condensation process stops. From this moment, the water vapor pressure in bin 6 reaches a value equal to the atmospheric pressure, and the air is displaced from bin 6 by water vapor from the shredded waste layer to burner 10.

Simultaneous with the supply of air and water vapor, fuel is supplied at a preset rate from tank 11 via valve 12 to burner 10 to be burnt. The generated combustion products from burner 10 enter heating jacket 13 at a high temperature (about 1000° C.), flow down heating jacket 13, and enter steam generator 7, where the combustion products are cooled, and their heat is used to generate water vapor. Next, the combustion products cooled to a temperature not exceeding 150° C. are removed from steam generator 7 to smoke stack 15 using smoke exhauster 14. This enables efficient use of the heat of combustion products removed from jacket 13 and thus to reduce the energy consumption for the waste recycling process.

At the moment when the rubber waste temperature in bin 6 reaches $T_H$=100° C., which is monitored by readings of temperature sensor 9, the water vapor supply to bin 6 from steam generator 7 is stopped. Gate 4 is opened, and the waste from bin 6 spill into furnace 16 under gravity. After this, gate 4 is closed. Simultaneous with closing gate 4, screw 18 is put into rotation by motor 17 and starts moving the waste from the loading to discharge channel 19.

Simultaneous with feeding the rubber waste to furnace 16, i.e. its discharge from bin 6, heavy hydrocarbon fraction is supplied at a preset flow rate to nozzle 23 from tank 20 with heavy hydrocarbon fraction using adjustable pump 21 via flowmeter 22.

At the plant starting stage, until a heavy hydrocarbon fraction is generated, residual fuel oil is filled into tank 20 to use it as heavy hydrocarbon fraction, since the physicochemical properties of the heavy fraction of thermal decomposition of rubber-containing waste are close to similar properties of residual fuel oil.

From steam generator 7, water vapor is supplied at a preset rate to nozzle 23 with adjustable pump 24 via flowmeter 25.

By adjusting the flow rates of water vapor and heavy hydrocarbon fraction, the weight ratio of heavy fraction and water vapor supplied to nozzle 23 is set within (0.1-0.5):1.

In nozzle 23, under the action of the water vapor flow, the heavy hydrocarbon fraction is atomized into droplets of 0.1-0.5 mm; as a result, a two-phase fluid (water vapor and heavy hydrocarbon fraction drops) is generated in furnace 16, to which the rubber waste loaded from bin 6 is fed.

The two-phase fluid so generated transfers heat by convection from heating jacket 13 to the rubber waste surface. Due to heavy fraction drops it contains, this fluid has a density higher than that of water vapor. This is because the density of the heavy hydrocarbon fraction is 950-1000 kg/m$^3$, and the density of water vapor in the furnace does not exceed 1 kg/m$^3$. Since a two-phase fluid has a higher density than pure water vapor, this fluid transfers heat more intensely, so that the waste heating time is reduced.

Supply of water vapor and atomized heavy hydrocarbon fraction to the waste charging area creates a high temperature difference between the water vapor with heavy fraction drops (temperature of about 300° C.) and cold waste at a temperature of about 30-40° C. And this (high temperature difference) provides high heat flows to the waste by convective transfer of heat energy, resulting in faster waste heating and shorter time of its processing.

Rubber waste moved by screw 18 is heated both by heat exchange with jacket 13 itself, through which the combustion products flow, and by convective heat exchange with heavy hydrocarbon fraction atomized in water vapor. In doing so, drops of heated heavy hydrocarbon fraction, settling on the surface of rubber waste, heat the waste intensely, and dissolve the waste's surface layer. All this results in faster thermal decomposition of rubber, i.e. in a shorter waste processing time and as a result, in lower energy consumption for the process.

When heating the rubber waste in furnace 16 to a temperature of 300-500° C., rubber waste thermolysis starts, with separation of gaseous products and a solid residue. In doing so, the temperature in furnace 16 is monitored by readings of temperature sensor 26 and adjusted by changing the quantity of heat burnt in burner 10.

The gaseous products of waste decomposition are mixed with water vapor and atomized heavy hydrocarbon fraction, generating a two-phase mixture in furnace 16, with the pressure in the reactor rising above the atmospheric value.

During the heating in furnace 16, partial evaporation and thermal decomposition of the heavy hydrocarbon fraction also take place, generating hydrocarbons with a lower molecular weight (valuable light hydrocarbons) and soot. Thus, the quality of rubber-containing waste processing products is improved.

The generated gaseous products of waste decomposition in a mixture with water vapor, soot, and products of thermal decomposition of the heavy fraction in the form of vapor-gas mixture are supplied as a vapor-gas mixture via flowmeter 28 to scrubber 29 from furnace 16, with the flow rate adjusted with valve 27.

Simultaneously, water generated in settler 30 as a result of condensate breaking is supplied from settler 30 with adjustable pump 31 via flowmeter 32 to nozzle 33.

The vapor-gas mixture flow rate is adjusted with valve 27, and the water flow rate is adjusted with pump 31, thus setting the quantity of water atomized by nozzle 33 in the vapor-gas mixture flow within 5-15% of the mixture's mass flow rate.

In scrubber 29, as a result of heat exchange of vapor-gas mixture and water drops, the water drops are heated and evaporated, and the mixture is cooled. As a result of the mixture cooling, high-molecular hydrocarbons are condensed with separation of a heavy fraction. This condensation takes place not on the surface but in bulk, therefore pairs of high-molecular hydrocarbons are condensed forming drops. Precipitated on these drops is carbon dust (soot) carried from furnace 16. The drops settle in the scrubber forming a liquid phase, which is removed from scrubber 29 to tank 20. The atomized water is fully evaporated generating water vapor. In doing so, the vapor-gas mixture cooling temperature in scrubber 29 is monitored by readings of temperature sensor 34 and adjusted by changing the atomized water flow rate.

The vapor-gas mixture cleaned free of the heavy hydrocarbon fraction and carbon dust is removed from scrubber 29 to condenser 35, where this mixture is cooled by pumping through the water condenser jacket from cooling tower 36. The temperature in the condenser is monitored by readings of temperature sensor 37.

As a result of cooling in condenser 35, some of the vapor-gas mixture is condensed forming condensate containing water and liquid hydrocarbons, and some of it is not. Condensate from condenser 35 is drained to settler 30, where water and liquid hydrocarbons are separated. As water has a higher density, it is accumulated in the lower part of settler 30, while liquid hydrocarbons are accumulated in its upper part. Liquid hydrocarbons are drained from settler 30 via valve 38 to accumulation tank 39. From settler 30, a part of the water equal to the water vapor flow rate is supplied to filter 41 via flowmeter 40. The water is cleaned free of organic compounds (hydrocarbons) in filter 41, and then supplied to steam generator 7 for water vapor generation. Water circulation in a closed circuit prevents its discharge to the environment, which improves the environmental performances of waste processing, as harmful pollutions of the environment are reduced.

Noncondensable hydrocarbons from condenser 35 are supplied to burner 10 with adjustable pump 42 and burnt. In doing so, the flow rate of the fuel fed to burner 10 from tank 11 is reduced. The combustion of noncondensable gases prevents their emission to the environment, and reduces the consumption of additional fuel for the rubber-containing waste recycling process.

Liquid hydrocarbons from accumulation tank 39 are supplied at a preset rate to burner 10 with adjustable pump 43 via flowmeter 44, and burnt. In doing so, fuel supply from tank 11 is stopped.

The use of liquid hydrocarbons produced in the waste recycling process as fuel enables avoiding the consumption of additional fuel.

The solid residue is removed from furnace 16 via discharge channel 19 to cooler 46 with the aid of lock feeder 45. Cooling water is pumped through jacket 47 of cooler 46 from cooling tower 36. Motor 48 is started to rotate screw 49, which moved the solid residue from the loading to the discharge. When moving in the cooler, the solid carbon residue is cooled to a temperature not exceeding 100° C., which is monitored by readings of temperature sensor 50. The cooled residue is unloaded from cooler 46 to magnetic separator 51, where metal is separated from the solid residue. The metal is unloaded from the magnetic separator to accumulator 52, and the solid residue cleaned free of metal is fed to dielectric separator 53, where non-conductive materials (oxides), zinc oxide in particular, are separated from the solid residue. From the dielectric separator, zinc oxide in a mixture with other oxides (oxides of silicon, calcium, titanium etc.) is discharged to accumulator 54. The zinc oxide content in this mixture reaches 30-40% depending on the rubber-containing waste type, therefore this mixture is a high-quality feedstock for zinc oxide production.

The cleaned solid residue is discharged from dielectric separator 53 to accumulator 55. As a result of separation of metal and metal oxides from the solid residue, the carbon content in the residue increases, and therefore the solid residue so processed is similar to industrial carbon. Thus, as a result of successive magnetic and dielectric separation of solid residue, quality industrial carbon and high-grade feedstock for zinc oxide production are obtained.

The invention is illustrated by the following examples.

Example 1

From accumulator 1, with gates 3 and 4 closed, shredded rubber waste 5 is fed to bin 2 as chips 50 m×30 m×50 mm in size, having a bulk density of 500 kg/m³. In a loaded bin 2 of a capacity of 1 m³, the chips' weight will be 500 kg. When bin 2 is filled up, gate 3 is opened and the waste from bin 1 spill down to bin 6 and is held off on gate 4. After this, gate 3 is closed. From steam generator 7, water vapor is supplied to bin 6 with adjustable-delivery pump 8, at the rate of 600 kg/h and temperature of 110° C. Getting on a large cold surface (chips' temperature: 20° C.) of rubber chips, the water vapor is abruptly cooled to below 100° C. and starts partially condensing, emitting condensation heat $r_K$=2500 kJ/kg. With this condensation heat, the rubber waste is heated to $T_H$=100° C. The waste heating temperature is monitored by readings of temperature sensor 9.

To heat 500 kg of rubber waste from the initial temperature $T_0$=20° C. to the heating temperature $T_H$=100° C., 30 kg of water vapor will be condensed. This means that at the water vapor flow rate of 600 kg/h, the time of waste heating to 100° C. and stop of condensation will be 3 minutes.

Water vapor displaces air from the chips' layer in bin 6, which enters burner 10 with the vapor flow.

When the chips are heated to the temperature of $T_H$=100° C., supply of water vapor to bin 2 from steam generator 7 is stopped. The heating of the chips layer in bin 6 to $T_H$=100° C. means that the air is actually completely displaced by water vapor.

Simultaneous with the supply of air and water vapor from bin 6, fuel is supplied to burner 10 from tank 11 via valve 12 at the rate of 150 kg/h, and is burnt there. The generated combustion products from burner 10 enter heating jacket 13 at a high temperature (about $T_{burner}$=1000° C.) and at a rate of 3900 kg/h. Burning 1 kg of liquid fuel produces 26 kg of combustion products at the temperature of 1000° C.

The combustion products flow along heating jacket 13, are cooled to a temperature of $T_1$=600° C., and enter steam generator 7, where the combustion products are cooled to $T_2$=120° C., with their heat used to produce water vapor at the rate of 600 kg/h.

Next, the combustion products cooled to the temperature $T_2$=120° C. are removed from steam generator 7 to smoke stack 15 using smoke exhauster 14, at the rate of 3900 kg/h.

This enables efficient use of the heat of combustion products removed from heating jacket 13, thus reducing the energy consumption for waste processing.

Otherwise, with combustion products vented at $T_1$=600° C. immediately to the smoke stack at the rate of 3900 kg/h, the following quantity of thermal energy $Q_{ATM}$ will be emitted to the atmosphere (environment):

$$Q_{ATM}=C_r{}^C M_C(T_1-T_r)=1.2 \text{ kJ/kg° C.} \times 3900 \text{ kg/h} \times (600° \text{ C.}-120° \text{ C.})==2246400 \text{ kJ/h, or } 624 \text{ kW,}$$

where $C_r{}^C$=combustion products specific heat capacity, 1.2 kJ/kg° C.;

$M_C$=combustion products flow rate, 3900 kg/h;

$T_1$=combustion products outlet temperature, 600° C.;

$T_r$=combustion products temperature after the steam generator, 120° C.

Thus, in this case 624 kW of heating capacity is not utilized, sufficient to produce 600 kg/h of water vapor used in the processing.

The use of this heating capacity to produce water vapor enables, in our case, reducing the energy consumption for rubber waste processing.

At the moment when the rubber waste temperature in bin 6 reaches $T_{vapor}$=100° C., which is monitored by readings of temperature sensor 9, gate 4 is opened, and waste from bin 6 enters furnace 16 under gravity in the amount of 500 kg. After this, gate 4 is closed. Simultaneous with opening gate 4, screw 18 is put into rotation by motor 17 at a speed of 2 rpm. The waste charged into furnace 16 hangs about on screw 18 as a layer, and as the screw rotates, the waste is gradually picked out of the layer by screw 18, moving the waste from the loading to discharge channel 19 at a rate of 1000 kg/h. Thus, screw 18 will out 500 kg of rubber-containing waste from the layer, and move them for 30 minutes. In this time, a new batch of waste of 500 kg is loaded from accumulator 1 to bin 2, and blown with water vapor. Therefore, to provide a capacity of 1000 kg/h, two batches of waste have to be charged and blown with water vapor in one hour.

Simultaneous with feeding the rubber waste to furnace 16, i.e. its discharge from bin 6, heavy hydrocarbon fraction is supplied to nozzle 23 from tank 20 with heavy hydrocarbon fraction using adjustable pump 21 via flowmeter 22 at the rate of 30 kg/h.

At the plant starting stage, until a heavy hydrocarbon fraction is generated, 30 kg of residual fuel oil is filled into tank 20 to use it as heavy hydrocarbon fraction, since the physico-chemical properties the heavy hydrocarbon fraction of thermal decomposition of rubber-containing waste are close to similar residual fuel properties.

From steam generator 7, water vapor is supplied to nozzle 23 at the rate of 300 kg/h, with adjustable pump 24 via flow meter 25.

Adjusting the flow rates of water vapor and heavy hydrocarbon fraction, the weight ratio of the heavy fraction and water vapor supplied to nozzle 23 is set within (0.1):1, which is equal to (30 kg): 300 kg.

In our case, to provide a waste capacity of 1000 kg/h, the water vapor flow rate is set at 300 kg/h, and the heavy hydrocarbon fraction flow rate, at 30 kg/h.

In nozzle 23, under the action of the water vapor flow at the temperature of $T_{vapor}=110°$ C., the heavy hydrocarbon fraction is atomized into droplets of 0.1-0.5 mm; as a result, a two-phase fluid (water vapor and heavy hydrocarbon fraction drops) is generated in furnace 16, to which the rubber waste loaded from bin 6 is fed.

The generated two-phase fluid transfers heat from heating jacket 13 to the rubber waste surface by convection. Due to the heavy fraction drops, this fluid has a density higher than that of water vapor. This is because the density of the heavy hydrocarbon fraction is 950 kg/m³, and the water vapor density in our case is 0.6 kg/m³. In our case, when atomizing of 30 kg of heavy hydrocarbon fraction in 300 kg of water vapor, the density of the generated two-phase fluid will be:

$$\rho = \frac{M_V + M_F}{Vmix} = \frac{300 \text{ kg} + 30 \text{ kg}}{500 \text{ m}^3} = 0.67 \frac{\text{kg}}{\text{m}^3}, V_{mix.} = \frac{300 \text{ kg}}{0.6 \frac{\text{kg}}{\text{m}^3}} = 500 \text{ m}^3,$$

where $M_v$=water vapor weight, 300 kg;

$M_F$=heavy fraction weight, 30 kg.

Since the two-phase fluid's density is in our case 12% higher than the pure water vapor density, the process of heat transfer by such two-phase fluid, compared to heat transfer by pure water vapor, is intensified both due a higher density and due to higher heat exchange coefficients of the two-phase fluid with rubber waste. The increase of the heat exchange coefficients, and thus of heat transfer intensity, is explained by liquid fraction drops contained in the two-phase fluid. When heated drops of liquid phase get on the rubber waste surface, high temperature differences occur as a result of their contact (temperature difference between a hot droplet and a colder waste surface) occur; as a result, the heat transfer from heated drops to the waste intensifies (the heat flow increases).

With a lower heavy fraction content in the mixture, i.e. with a weight ratio of heavy fraction and water vapor lower than (0.1):1, the intensity of heat transfer by such mixture to the waste decreases.

Supplying water vapor and atomized heavy hydrocarbon fraction to the waste charging area provides a high temperature difference between water vapor with heavy fraction drops (temperature of at least 110° C.) and cold waste at a temperature of about 30-40° C. And this (high temperature difference) provides high heat flows, resulting in faster waste heating and shorter time of its processing.

The rubber waste moved by screw 18 at the rate of 1000 kg/h is heated both by heat exchange with jacket 13 itself and by heat exchange with heavy hydrocarbon fraction atomized in water vapor. In doing so, drops of the heated heavy hydrocarbon fraction, when settling on the surface of rubber waste, not only heat it intensely, but also dissolve the surface layer of the waste. All this results in faster thermal decomposition of rubber, i.e. in a shorter waste processing time and as a result, in lower energy consumption for the process.

When heating the rubber waste in furnace 16 to the temperature of 500° C., rubber waste thermolysis is carried out, separating gaseous products and a solid carbon residue. The temperature in furnace 16 is monitored by readings of temperature sensor 26 and adjusted by changing the quantity of fuel burnt in burner 10.

In our case, at a waste capacity of 1000 kg/h, 400 kg/h of gaseous products of thermal decomposition of waste and 600 kg/h of solid residue containing 100 kg of metal (metal cord) and 72 of metal oxides (oxides of zinc, titanium, iron, aluminum, copper etc.) are generated.

The gaseous products of waste decomposition are mixed with water vapor and atomized heavy hydrocarbon fraction; as a result, a two-phase mixture is generated in furnace 16, and the pressure in the reactor rises above the atmospheric value.

In our case, 400 kg/h of gaseous products of decomposition is mixed with 300 kg/h of water vapor and 20 kg/g of gaseous products of thermal decomposition of the heavy hydrocarbon fraction, generating a vapor-gas mixture at the rate of 720 kg/h.

During the heating in furnace 16, partial evaporation and thermal decomposition of the heavy hydrocarbon fraction also take place, generating hydrocarbons with a lower molecular weight (valuable light hydrocarbons) and soot.

Assume that as a result of thermal decomposition of 30 kg/h of the heavy hydrocarbon fraction, 20 kg/h of gaseous products is generated with a lower molecular weight than the initial heavy fraction. The other 10 kg/h of 30 kg/h of heavy fraction in the form of soot is mixed with the solid residue of rubber waste thermal decomposition.

As a result of thermal decomposition of the heavy hydrocarbon fraction atomized in the reactor, valuable hydrocarbons with a lower molecular weight are generated, as well as soot with a low metal oxide (ash) content, since the initial heavy hydrocarbon fraction had a low metal oxide content.

Thus, the quality of rubber-containing waste processing products is improved.

The generated gaseous products of waste decomposition in a mixture with water vapor and products of thermal decomposition of the heavy fraction in the form of vapor-gas mixture are supplied via flowmeter 28 to scrubber 29 from furnace 16, adjusting the flow rate with valve 27 so that the flow rate should not exceed 720 kg/h. Such adjustment of the flow rate, that is the quantity of vapor-gas mixture removed from the reactor, is necessary to maintain the pressure in the reactor above the atmospheric value, to prevent air leak to the reactor and generation of an explosive mixture in the reactor.

Simultaneously, water generated in settler 30 as a result of condensate breaking is supplied from settler 30 with adjustable pump 31 via flowmeter 32 to nozzle 33.

The vapor-gas mixture flow rate is adjusted with valve 27, and the water flow rate is adjusted with pump 31, thus setting the quantity of water atomized by nozzle 33 in the vapor-gas mixture flow at 5% of the mixture's mass flow rate.

In our case, for a vapor-gas mixture flow rate of 720 kg/h, the flow rate of water atomized into the mixture flow is 36 kg/h.

In scrubber 29, as a result of heat exchange between vapor-gas mixture and water drops, the water drops are heated and evaporated, and the mixture is cooled from the temperature of 400° C. to 350° C. As a result of mixture cooling, high-molecular hydrocarbons are condensed, forming a heavy fraction of 30 kg/h. This condensation takes place not on the surface but in bulk, therefore pairs of high-molecular hydrocarbons are condensed forming drops. Precipitated on these drops is carbon dust (soot) carried from furnace 16 at the rate of 10 kg/h. The generated drops precipitate in the scrubber, generating 30 kg/h of liquid phase mixture and 10 kg/h of soot. The generated mixture is removed from scrubber 29 to tank 20 at the rate of 40 kg/h.

The atomized water at the rate of 36 kg/h is completely evaporated generating water vapor. The temperature of vapor-gas mixture cooling in scrubber 29 is monitored by readings of temperature sensor 34 and adjusted by changing the atomized water flow rate, maintaining the temperature at 350° C.

When water is supplied at a rate lower than 5% of the mass flow rate of vapor-gas mixture, its cooling will be low, and the main bulk of heavy hydrocarbon fraction will not be separated from the vapor-gas mixture. This means that the heavy hydrocarbon fraction, which was not separated in scrubber 29, will settle in the tubes of condenser 35, which will cause its failure.

The water vapor cleaned free of the heavy hydrocarbon fraction and carbon dust is removed from scrubber 29 to condenser 35 at the rate of 716 kg/h. Since of 720 kg/h of vapor-gas mixture, 30 kg/h of heavy fraction and 10 kg/h of soot were separated in the scrubber, but 36 kg/h of water vapor were added, the quantity of vapor-gas mixture removed to the condenser is 716 kg/h.

In the condenser, the vapor-gas mixture is cooled to the temperature of $T_{COOL}=30°$ C. by pumping water from cooling tower 36 through the condenser jacket. The temperature in the condenser is monitored by readings of temperature sensor 37.

As a result of cooling in condenser 35, some of the vapor-gas mixture is condensed generating condensate at the rate of 690 kg/h. 690 kg of the condensate contains 336 kg of water and 354 kg of liquid hydrocarbons.

Condensate from condenser 35 is drained at the rate of 690 kg/h to settler 30, where water and liquid hydrocarbons are separated. As water has a higher density, it accumulated in the lower part of settler 30, while liquid hydrocarbons are accumulated in its upper part. Liquid hydrocarbons are drained from settler 30 via valve 38 to accumulation tank 39 at the rate of 354 kg/h. From settler 30, water is supplied via flowmeter 40 to filter 41 at the rate of 300 kg/h. In filter 41 water is cleaned free of organic compounds (hydrocarbons) and then supplied to steam generator 7 to make water vapor. Water circulation in a closed circuit prevents its discharge to the environment, which improves the environmental performances of waste processing, i.e. the environmental pollution is reduced.

Noncondensable hydrocarbons from condenser 35 are supplied to burner 10 with adjustable pump 42 at the rate of 26 kg/h, and burnt.

Since the calorific value of noncondensable hydrocarbons is 30,000 kJ/kg, the burning of 26 kg/h of hydrocarbons is equivalent to burning 20 kg/h of liquid fuel with the calorific value of 40,000 kJ/kg. Therefore the flow rate of liquid fuel supplied to burner 10 from tank 11 is reduced by 20 kg/h, i.e. to the value 130 kg/h.

The combustion of noncondensable gases prevents their emission to the environment, and reduces the consumption of additional fuel for rubber-containing waste processing.

Liquid hydrocarbons from accumulation tank 39 are supplied to burner 10 with adjustable pump 43 via flowmeter 44 at the rate of 130 kg/h, and burnt. In doing so, fuel supply from tank 11 is fully stopped.

The use of liquid hydrocarbons produced in the waste recycling process as fuel enables avoiding the consumption of additional fuel.

Solid carbon residue is withdrawn from furnace 16 with lock feeder 45 via discharge channel 19 to cooler 46 with cooling jacket 47 at the rate of 600 kg/h. Motor 48 is started to rotate screw 49, which moves the solid residue from the loading to the discharge. Simultaneously, cooling water is pumped from cooling tower 36 via jacket 47 of cooler 46. When moving in the cooler, the solid carbon residue is cooled to a temperature not higher than 100° C., which is monitored by readings of temperature sensor 50. The cooled solid residue is unloaded at 600 kg/h from cooler 46 to magnetic separator 51, where metal is separated from the solid residue at 100 kg/h. Metal is discharged from the magnetic separator at the rate of 100 kg/h and fed to accumulator 52, and the solid residue cleaned free of metal is fed at the rate of 500 kg/h to dielectric separator 53, where non-conductive materials (oxides), zinc oxide in particular, are separated from the solid residue at the rate of 62 kg/h. From the dielectric separator, zinc oxide in a mixture with other oxides (oxides of silicon, calcium, titanium etc.) at the rate of 62 kg/h is discharged to accumulator 54.

The zinc oxide content in this mixture reaches 30-40% depending on the rubber-containing waste type, therefore this mixture is a high-quality feedstock for zinc oxide production.

Cleaning the carbon residue free of oxides completely by dielectric separation only seems to be impossible, as some of the oxides are bound (connected) with carbon particles. Therefore such particles are conductive, unlike the oxides, and will be separated in the dielectric separator with carbon particles.

The cleaned solid residue is discharged from dielectric separator 53 to accumulator 55 at the rate of 438 kg/h. As a result of separation of metal and some of metal oxides from the solid residue, the carbon content in the residue increases. If there is 65 wt. % of carbon in 600 kg of crude solid residue, the carbon content after its cleaning will be 89 wt. %, and therefore the solid residue so processed is similar to industrial carbon.

Thus, as a result of successive magnetic and dielectric separation of solid residue, quality industrial carbon and high-grade feedstock for zinc oxide production are obtained.

Example 2

From accumulator 1, with gates 3 and 4 closed, shredded rubber waste 5 is fed to bin 2 as chips 20 mm×20 mm×20 mm in size. Such chips have a bulk density of 800 kg/m³. Therefore in a loaded bin 2 of a capacity of 1 m³, there will be 800 kg of chips in the bin. When bin 2 is filled, gate 3 is opened, and the waste from bin 1 spills down to bin 6 and is held off on gate 4. After this, gate 3 is closed. From steam generator 7, water vapor is supplied to bin 6 at the rate of 600 kg/h and temperature 110° C. with adjustable delivery pump 8. Getting on a large cold surface (chips' temperature: 20°

C.) of rubber chips, some of the water vapor is abruptly cooled to below 100° C. and starts condensing, emitting condensation heat $r_K$=2500 kJ/kg. Due to this condensation heat, the rubber waste is heated to $T_H$=100° C. The waste heating temperature is monitored by readings of temperature sensor 9.

Noncondensable water vapor displaces air from the chips' layer, which enters burner 10 with the vapor flow.

To heat 800 kg of rubber waste from the initial temperature $T_0$=20° C. to the heating temperature $T_H$=100° C., 50 kg of water vapor will be condensed. This means that for a water vapor flow rate of 600 kg/h, the time of waste heating to 100° C. will be 5 minutes.

The heating of the waste to $T_H$=100° C. means that the water vapor pressure in the waste layer has reached a value equal to atmospheric, and all the air from the waste has been displaced to burner 10.

After the chips have been heated to $T_H$=100° C., the supply of water vapor to bin 2 from steam generator 7 is stopped.

Simultaneous with the supply of air and water vapor from bin 2, fuel is supplied to burner 10 from tank 11 via valve 12 at the rate of 240 kg/h, and is burnt there. The generated combustion products from burner 10 at a high temperature (about $T_{burner}$=1000° C.) enter heating jacket 13 at the rate of 6240 kg/h. Burning 1 kg of liquid fuel produces 26 kg of combustion products at the temperature of 1000° C.

The combustion products flow along heating jacket 13, are cooled to the temperature of $T_1$=600° C., and enter steam generator 7, where the combustion products are cooled to $T_2$=120° C., with their heat used to produce water vapor at the rate of 600 kg/h.

Next, the combustion products cooled to the temperature $T_2$=120° C. are removed from steam generator 7 to smoke stack 15 using smoke exhauster 14, at the rate of 6240 kg/h.

This enables efficient use of the heat of combustion products removed from heating jacket 13, thus reducing the energy consumption for waste processing.

Otherwise, with combustion products vented at $T_1$=600° C. immediately to the smoke stack at the rate of 6240 kg/h, the following quantity of thermal energy $Q_{ATM}$ will be emitted to the atmosphere (environment):

$$Q_{ATM} = C_r^C M_C (T_1 - T_r) = 1.2 \text{ kJ/kg° C.} \times 6240 \text{ kg/h} \times (600° \text{ C.} - 120° \text{ C.}) = 3594240 \text{ kJ/h, or 998 kW,}$$

where $C_r^C$=combustion products specific heat capacity, 1.2 kJ/kg° C.;

$M_C$=combustion products flow rate, 6240 kg/h;

$T_1$=combustion products outlet temperature, 600° C.;

$T_r$=combustion products temperature after the steam generator, 120° C.

Therefore in this case, 998 kW of heat capacity sufficient for the production of 600 kg/h of water vapor used in the recycling process is not utilized.

The use of this heat capacity for water vapor generation enables, in our case, reducing the energy consumption for rubber waste processing.

Gate 4 is opened, and the waste from bin 6 in the amount of 800 enters furnace 16 under gravity. After this, gate 4 is closed. Simultaneous with opening gate 4, screw 18 is put into rotation by motor 17 at the speed of 4 rpm. The waste charged into the reactor hangs about on screw 18 as a layer, and as the screw rotates, the waste is gradually picked out of the layer by screw 18, which moves the waste from the loading to discharge channel 19 at the rate of 1600 kg/h. Thus, the screw will pick out of the layer and move 800 kg of rubber-containing waste in 30 minutes. In this time, a new batch of waste of 800 kg is loaded from accumulator 1 to bin 2, and blown with water vapor. Therefore, to provide a capacity of 1600 kg/h, two portions of waste have to be charged and blown with water vapor in one hour.

Simultaneous with feeding the rubber waste to furnace 16, i.e. its discharge from bin 6, the heavy hydrocarbon fraction from tank 20 with heavy hydrocarbon fraction is supplied at the rate of 240 kg/h to nozzle 23 with adjustable pump 21 via flowmeter 22.

At the plant starting stage, until a heavy hydrocarbon fraction is generated, residual fuel oil is filled into tank 20 in the amount of 240 kg to use it as heavy hydrocarbon fraction, since the physico-chemical properties of the heavy fraction of thermal decomposition of rubber-containing waste are close to similar values for residual oil.

From steam generator 7, water vapor is supplied to nozzle 23 at the rate of 480 kg/h, with adjustable pump 24 via flow meter 25.

By adjusting the flow rates of water vapor and heavy hydrocarbon fraction, the weight ratio of the heavy fraction and water vapor supplied to nozzle 23 is set within (0.5):1, or (240 kg): 480 kg.

In our case, to provide a waste capacity of 1600 kg/h, the water vapor flow rate is set at 480 kg/h, and the flow rate of heavy hydrocarbon fraction is set at 240 kg/h.

In nozzle 23, under the action of the water vapor flow at $T_{vapor}$=160° C., the heavy hydrocarbon fraction is atomized into droplets of 0.1-0.5 mm; as a result, a two-phase fluid (water vapor and heavy hydrocarbon fraction drops) is generated in furnace 16, to which the rubber waste loaded from bin 6 is fed.

The generated two-phase fluid transfers heat from heating jacket 13 to the rubber waste surface by convection. Due to the heavy fraction drops, this fluid has a density higher than that of water vapor. This is because the density of the heavy hydrocarbon fraction is 950 kg/m³, and the water vapor density in our case is 0.6 kg/m³. In our case, with 240 kg of heavy hydrocarbon fraction atomized in 480 kg of water vapor, the density of the generated two-phase mixture will be:

$$\rho = \frac{M_V + M_F}{Vmix} = \frac{480 \text{ kg} + 240 \text{ kg}}{800 \text{ m}^3} = 0.90 \frac{\text{kg}}{\text{m}^3}, V_{mix.} = \frac{480 \text{ kg}}{0.6 \frac{\text{kg}}{\text{m}^3}} = 800 \text{ m}^3,$$

where $M_v$=water vapor weight, 480 kg;

$M_F$=heavy fraction weight, 240 kg.

As the density of the two-phase fluid is in our case 50% higher than the density of pure water vapor, the process of heat transfer by such two-phase fluid, compared to heat transfer by pure water vapor, is intensified both due a higher density and due to higher coefficients of heat exchange of two-phase fluid with rubber waste. The increase of the heat exchange coefficients, and thus of heat transfer intensity, is explained by liquid fraction drops contained in the two-phase fluid. When heated drops of liquid phase get on the rubber waste surface, high temperature differences occur as a result of their contact (temperature difference between a hot droplet and a colder waste surface) occur; as a result, the heat transfer from heated drops to the waste intensifies (the heat flow increases).

If the heavy fraction content in the mixture is increased, i.e. at a weight ratio of heavy fraction and water vapor exceeding (0.5):1, the heavy liquid fraction flow rate will increase. In this case, during the atomization of heavy fraction into the vapor flow of 480 kg/h at a rate of over 240 kg/h, abrupt cooling of the vapor flow will take place, and its condensation will occur. This means that with this ratio above (0.5):1, a two-phase mixture in the form of heavy fraction drops in a water vapor stream cannot be obtained. Furthermore, due to a high concentration of drops in the vapor flow, the drops will intensely precipitate in the reactor itself and on rubber waste, thus disturbing the waste recycling process.

Supply of water vapor and atomized heavy hydrocarbon fraction to the waste charging area creates a high temperature difference between the water vapor with heavy fraction drops (temperature of at least 160° C.) and cold waste at a temperature of about 30-40° C. And this (high temperature difference) provides high heat flows to the waste, resulting in faster waste heating and shorter time of its processing.

The rubber waste moved by screw 18 at the rate of 1600 kg/h is heated both by heat exchange with jacket 13 itself and by heat exchange with heavy hydrocarbon fraction atomized in water vapor. In doing so, drops of the heated heavy hydrocarbon fraction settling on the rubber waste surface heat it intensely, and dissolve the surface layer of the waste. All this results in faster thermal decomposition of rubber, i.e. in a shorter waste processing time and as a result, in lower energy consumption for the process.

When heating the rubber waste in furnace 16 to the temperature of 500° C., rubber waste thermolysis is carried out, separating gaseous products and a solid carbon residue. In doing so, the temperature in furnace 16 is monitored by readings of temperature sensor 26 and adjusted by changing the quantity of fuel burnt in burner 10.

In our case, at a waste capacity of 1600 kg/h, 800 kg/h of gaseous products of thermal decomposition of waste and 800 kg/h of solid residue containing 80 kg of metal (metal cord) and 90 kg of metal oxides (oxides of zinc, titanium, iron, aluminum, copper etc.) are generated.

The gaseous products of waste decomposition are mixed with water vapor and atomized heavy hydrocarbon fraction, generating a two-phase mixture in furnace 16, with the pressure in the reactor rising above the atmospheric value.

In our case, 800 kg/h of gaseous products of decomposition is mixed with 480 kg/h of water vapor and 120 kg/h of gaseous products of thermal decomposition of heavy hydrocarbon fraction, forming a vapor-gas mixture at the rate of 1400 kg/h.

During the heating in furnace 16, partial evaporation and thermal decomposition of the heavy hydrocarbon fraction also take place, generating hydrocarbons with a lower molecular weight (valuable light hydrocarbons) and soot.

Assume that as a result of thermal decomposition of 240 kg/h of the heavy hydrocarbon fraction, 120 kg/h of gaseous products is generated with a lower molecular weight than the initial heavy fraction. The other 120 kg/h of heavy fraction in the form of soot is mixed with the solid residue of thermal decomposition of rubber waste.

As a result of thermal decomposition of the heavy hydrocarbon fraction atomized in the reactor, valuable hydrocarbons with a lower molecular weight are generated, as well as soot with a low metal oxide (ash) content, since the initial heavy hydrocarbon fraction had a low metal oxide content.

Thus, the quality of rubber-containing waste processing products is improved.

The generated gaseous products of waste decomposition in a mixture with water vapor and products of thermal decomposition of the heavy fraction in the form of vapor-gas mixture are supplied via flowmeter 28 to scrubber 29 from furnace 16, adjusting the flow rate with valve 27 so that the flow rate should not exceed 1400 kg/h. Such adjustment of the flow rate, that is the quantity of vapor-gas mixture removed from the reactor, is necessary to maintain the pressure in the reactor above the atmospheric value, to prevent air leak to the reactor and generation of an explosive mixture in the reactor.

Simultaneously, the water generated in settler 30 as a result of condensate breaking is supplied from settler 30 to nozzle 33 with adjustable pump 31 via flowmeter 32.

The vapor-gas mixture flow rate is adjusted with valve 27, and the water flow rate is adjusted with pump 31, thus setting the quantity of water atomized by nozzle 33 in the vapor-gas mixture flow at 15% of the mixture's mass flow rate.

In our case, at the vapor-gas mixture flow rate of 1400 kg/h, the flow rate of water atomized into the mixture flow is 210 kg/h.

In scrubber 29, as a result of heat exchange of vapor-gas mixture and water drops, the water drops are heated and evaporated, and the mixture is cooled from the temperature of 500° C. to 300° C. As a result of mixture cooling, condensation of high molecular hydrocarbons takes place generating a heavy fraction at the rate of 220 kg/h. This condensation takes place not on the surface but in bulk, therefore the vapors of high molecular hydrocarbons are condensed generating drops. Precipitated on these drops is carbon dust (soot) carried from furnace 16 at the rate of 20 kg/h. The generated drops precipitate in the scrubber, generating a mixture of 220 kg/h of liquid phase and 20 kg/h of soot. The generated mixture is removed from scrubber 29 to tank 20 at the rate of 240 kg/h.

The atomized water is completely evaporated at the rate of 210 kg/h, generating water vapor. The temperature of vapor-gas mixture cooling in scrubber 29 is monitored by readings of temperature sensor 34 and adjusted by changing the atomized water flow rate, maintaining the temperature at 300° C.

If water is supplied at a rate over 15% of the mass flow rate of vapor-gas mixture, some of the water will not evaporate in the vapor-gas mixture flow and will precipitate with the heavy fraction and soot in the scrubber. This will result in a mixture of heavy fraction with water and soot in the scrubber, so that additional processing of such mixture will be needed to separate water, which will increase the energy consumption for the processing.

The vapor-gas mixture cleaned free of heavy hydrocarbon fraction and carbon dust (soot) is removed from scrubber 29 to condenser 35 at the rate of 1370 kg/h. Since of 1400 kg/h of vapor-gas mixture, 220 kg/h of heavy fraction and 20 kg/h of soot were separated in the scrubber, but 210 kg/h of water vapor were added, the quantity of vapor-gas mixture removed to condenser 35 is 1370 kg/h.

In condenser 35, the vapor-gas mixture is cooled to the temperature of $T_{OX}$=30° C. by pumping water from cooling tower 36 through the condenser jacket. In doing so, the temperature in the condenser is monitored by readings of temperature sensor 37.

For cooling and condensation of vapor-gas mixture in condenser, the following quantity of circulating water must be pumped through its jacket:

$$M_W = \frac{Q_C}{C_R^W \times (T_{IN} - T_{OUT})} = \frac{2 \times 1370 \times (300 - 30) + 1000 \times 1250}{4.18 \times (80 - 30)} = 9520 \text{ kg/h.}$$

where $Q_C = C_{MIX} \times G_{MIX} \times (T_{MIX} - T_{COOL}) + R_C M_C$;
$C_R^W$=specific heat capacity of water, 4.18 kJ/kg° C.;
$C_{MIX}$=specific heat capacity of vapor-gas mixture, 2.0 kJ/kg ° C.;
$T_{IN}$=cooling water temperature at the condenser inlet, 30° C.;
$T_{OUT}$=cooling water temperature at the condenser outlet, 80° C.;
$T_{MIX}$=vapor-gas temperature at the condenser inlet, 300° C.;
$T_{COOL}$=cooling temperature, 30° C.;
$R_C$=specific heat of vapor-gas mixture condensation, 1000 kJ/kg;
$M_C$=quantity of condensate generated, 1250 kg/h;
$G_{MIX}$=mixture's flow rate, 1370 kg/h.

As a result of cooling in condenser 35, some of the vapor-gas mixture is condensed producing 1250 kg/h of condensate. 1250 kg of the condensate contains 690 kg of water and 560 kg of liquid hydrocarbons.

Condensate from condenser 35 is drained at the rate of 1250 kg/h to settler 30, where water and liquid hydrocarbons are separated. As water has a higher density, it is accumulated in the lower part of settler 30, while liquid hydrocarbons are accumulated in its upper part. The liquid hydrocarbons from settler 30 are drained to accumulation tank 39 via valve 38 at the rate of 560 kg/ч.

Water from settler 30 is supplied to filter 41 via flowmeter 40 at the rate of 690 kg/h. The water is cleaned free of organic compounds (hydrocarbons) in filter 41, and then supplied to steam generator 7 for water vapor generation. Water circulation in a closed circuit prevents its discharge to the environment, which improves the environmental performances of waste processing, as harmful pollutions of the environment are reduced.

Noncondensable hydrocarbons are fed from condenser 35 to burner 10 by adjustable pump 42 at a flow rate of 120 kg/h, and are burnt there.

Since the specific calorific value of noncondensable hydrocarbons is 30,000 kJ/kg, the combustion of 120 kg/h of hydrocarbons is equivalent to combustion of 90 kg/h of liquid fuel with a calorific value of 40,000 kJ/kg. Therefore the flow rate of liquid fuel supplied to burner 10 from tank 11 is reduced by 90 kg/h, i.e. to 150 kg/h.

The combustion of noncondensable gases prevents their emission to the environment, and reduces the consumption of additional fuel for rubber-containing waste processing.

Liquid hydrocarbons from accumulation tank 39 are supplied to burner 10 with adjustable pump 43 via flowmeter 44 at the rate of 150 kg/h, and burnt. In doing so, fuel supply from tank 11 is fully stopped.

The use of liquid hydrocarbons produced in the waste recycling process as fuel enables avoiding the consumption of additional fuel.

The solid residue is removed from furnace 16 via discharge channel 19 with the aid of lock feeder 45 at the rate of 800 kg/h to cooler 46, which is a screw conveyor with cooling jacket 47. Motor 48 is started to rotate screw 49, which moves the solid residue from the loading to the discharge. Simultaneously, cooling water is pumped from cooling tower 36 via jacket 47 of cooler 46. When moving along the cooler, the solid carbon residue is cooled to a temperature not exceeding 100° C., which is monitored by readings of temperature sensor 50. The cooled residue from cooler 46 is discharged at the rate of 800 kg/h to magnetic separator 51, where metal is separated from the carbon residue at 80 kg/h. From the magnetic separator, metal is discharged to accumulator 52 at the rate of 80 kg/h, and the solid residue cleaned free of metal is supplied at the rate of 720 kg/h to dielectric separator 53, where non-conductive materials (oxides) are separated from the solid residue, zinc oxide at 45 kg/h in particular. From dielectric separator 53, zinc oxide in a mixture with other oxides (oxides of silicon, calcium, titanium etc.) is discharged to accumulator 54 at the rate of 45 kg/h. The zinc oxide content in this mixture reaches 30-40% depending on the rubber-containing waste type, therefore this mixture is a high-quality feedstock for zinc oxide production.

The cleaned solid residue is discharged from dielectric separator 53 to accumulator 55 at the rate of 675 kg/h. As a result of separation of metal and metal oxides from the solid residue, the carbon content increases. If there is 65 wt. % of carbon in 800 kg of crude solid residue, the carbon content after its cleaning will be 77 wt. %, and therefore the solid residue so processed is similar to industrial carbon.

Thus, as a result of successive magnetic and dielectric separation of solid residue, quality industrial carbon and high-grade feedstock for zinc oxide production are obtained.

The claimed method of rubber-containing waste processing differs from prior art in its improved performances of energy consumption, environmental pollution, and quality of obtained products.

What is claimed is:

1. A method of processing of shredded rubber-containing waste, the method comprising:
    preliminary preparing of the waste by blowing it with water vapor until a waste temperature of 100° C. is reached;
    thermally decomposing the waste in a furnace;
    separating decomposition products into a vapor-gas mixture and a solid residue, and
    separating a heavy hydrocarbon fraction from the vapor-gas mixture; wherein
    the thermal decomposing step is carried out at 300-500° C. in residual oil in a starting phase and then in an atomized generated heavy hydrocarbon fraction and a superheated water vapor at a weight ratio of the atomized generated heavy hydrocarbon fraction to the superheated water vapor said weight ration being (0.1-0.5):1;
    wherein water of a condensate generated in cooling of the vapor-gas mixture is used to separate the heavy hydrocarbon fraction the vapor-gas mixture by atomizing the water into a vapor-gas mixture flow in an amount of 5-15% of the mass flow rate of the vapor-gas mixture; and
    wherein in the thermally decomposing step liquid hydrocarbons from the condensate are used as fuel while metal is extracted from the solid residue by magnetic separation and a product containing zinc oxide is separated to obtain industrial carbon.

* * * * *